United States Patent [19]

Washizu et al.

[11] Patent Number: 5,005,534
[45] Date of Patent: Apr. 9, 1991

[54] INTAKE SYSTEM FOR AUTOMOTIVE ENGINE

[75] Inventors: Takehiro Washizu; Tsutomu Nagamatsu, both of Iwata, Japan

[73] Assignee: Yamaha Hatsudoki Kabushiki Kaisha, Iwata, Japan

[21] Appl. No.: 485,460

[22] Filed: Feb. 27, 1990

[30] Foreign Application Priority Data

Mar. 3, 1989 [JP] Japan .................. 1-51613

[51] Int. Cl.⁵ .......................... F02M 35/10
[52] U.S. Cl. ................ 123/52 M; 123/198 E
[58] Field of Search ......... 123/52 M, 52 MV, 52 MB, 123/52 MC, 195 A, 195 C, 198 E

[56] References Cited

U.S. PATENT DOCUMENTS

| | | | |
|---|---|---|---|
| 4,048,366 | 9/1977 | Kingsbury | 123/195 C |
| 4,077,383 | 3/1978 | Hatz | 123/195 C |
| 4,164,262 | 8/1979 | Skatsche et al. | 123/195 C |
| 4,231,344 | 11/1980 | Urbihati et al. | 123/195 C |
| 4,257,368 | 3/1981 | Hofbauer | 123/195 C |
| 4,324,208 | 4/1982 | Danckert et al. | 123/195 C |
| 4,338,889 | 7/1982 | Kirchweger et al. | 123/195 C |
| 4,765,285 | 8/1988 | Kobayashi | 123/52 M |
| 4,790,864 | 12/1988 | Kostun | 123/198 E |
| 4,817,566 | 4/1989 | Newman | 123/52 MV |
| 4,898,144 | 2/1990 | Kobayashi et al. | 123/52 M |

*Primary Examiner*—David A. Okonsky
*Attorney, Agent, or Firm*—Ernest A. Beutler

[57] ABSTRACT

An induction system for an internal combustion engine that is disposed transversely in an engine compartment. The induction system comprises a plurality of manifold runners that emanate from one side of the cylinder head, extend over the top of the cylinder head and terminate at a plenum chamber positioned on the other side of the cylinder head. For sound deadening purposes, a sound deadening baffle plate is affixed to the manifold runners. In some embodiments, this is done on the top of the manifold and in other embodiments, it is done on the underside of the manifold runners.

20 Claims, 8 Drawing Sheets

INTAKE SYSTEM FOR AUTOMOTIVE ENGINE

BACKGROUND OF THE INVENTION

This invention relates to an intake system for an automotive engine and more particularly to a silencing arrangement for silencing the noises emanating from an automotive engine.

It has been recognized that the performance of an internal combustion engine can be improved by utilizing an induction system having relatively long runners that serve the intake passages of the engine under low speed running. Of course, the ability to lengthen the runners is dependent upon the room available. With modern motor vehicles, the engine compartment is very small and there is not a great deal of room for such extended manifold systems.

Furthermore, it is a common practice to provide a transverse engine placement in the engine compartment for driving the adjacent wheels. Of course, this further adds to the problem of providing adequate manifolding to achieve the desired performance.

It has been proposed to provide a plurality of intake manifold runners that extend from rearwardly facing intake ports back over the top of the engine and toward the forward side in order to lengthen the induction system. Frequently it is also desirable to provide a plenum chamber at the inlet to these long runners so as to further improve performance. Of course, this gives rise to further placement problems, as aforenoted.

Also, it is desirable to provide a low hood line for the vehicle for both streamlining and styling purposes. This means that the hood may be quite close to the engine and this can give rise to the emanation of engine noise to the occupants of the vehicle.

It is, therefore, a principal object of this invention to provide an improved intake system for an engine wherein there is additionally provided a sound deadening between the induction system or components of the engine and the hood so as to avoid the generation of extraneous noises.

It is a further object of this invention to provide an improved compact induction system and silencing arrangement for an automotive engine.

It is a yet further object of this invention to provide an improved induction system and silencing arrangement for a transversely disposed internal combustion engine utilized to power a motor vehicle.

SUMMARY OF THE INVENTION

This invention is adapted to be embodied in an internal combustion engine that is disposed transversely in an engine compartment closed by a hood. A plurality of cylinders lie in a bank and each has at least one intake port facing in the same direction in the engine compartment. A plurality of manifold runners each extend from a respective one of the intake ports and in an opposite direction in the engine compartment so as to lie at least in part over the cylinder bank and beneath the hood. A sound deadening material is affixed relative to the manifold runners and is interposed between at least a portion of the engine and the hood for sound deadening purposes.

DETAILED DESCRIPTION OF THE PREFERRED EMBODIMENTS OF THE INVENTION

Figure 1:
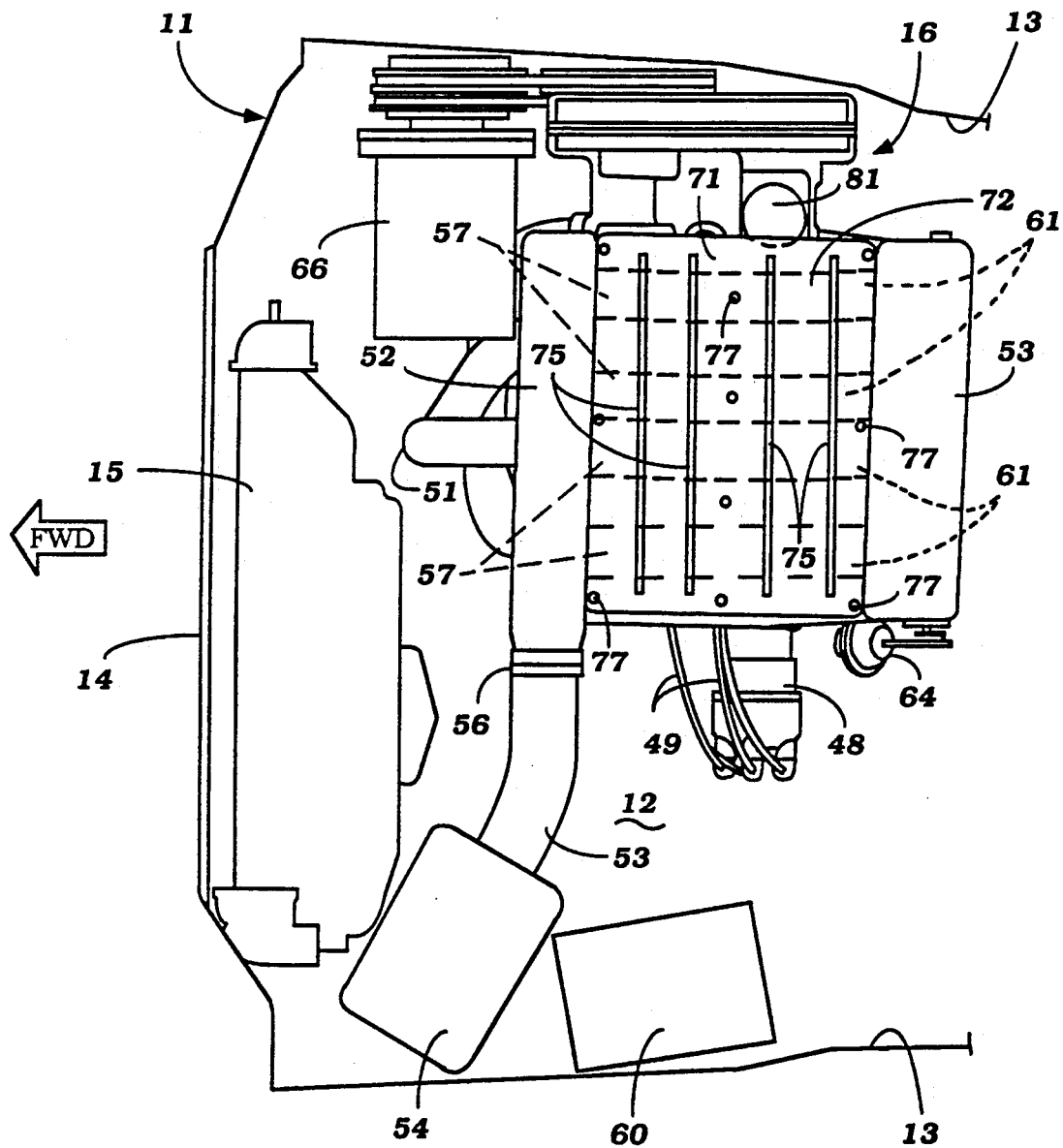
FIG. 1 is a top plan view of a portion of the engine compartment of a motor vehicle constructed in accordance with an embodiment of the invention with the hood removed so as to more clearly show the construction.

Referring first in detail to FIG. 1, a motor vehicle powered by an internal combustion engine having an induction system constructed in accordance with an embodiment of the invention is identified generally by the reference numeral 11. Only the forward portion of the vehicle 11 is shown and specifically the engine compartment 12 that is defined by a pair of fender aprons 13 and a front grille opening 14 behind which a cooling radiator 15 is positioned. The hood is removed in FIG. 1 to more clearly show the construction.

An internal combustion engine, constructed in accordance with an embodiment of the invention is identified generally by the reference numeral 16 and, in the illustrated embodiment, comprises a four cylinder in line engine that is positioned transversely across the engine compartment 12. The engine 16 drives the front wheels (not shown) of the vehicle 11 through a suitable transmission and differential mechanism as is well known in this art.

Figure 2:
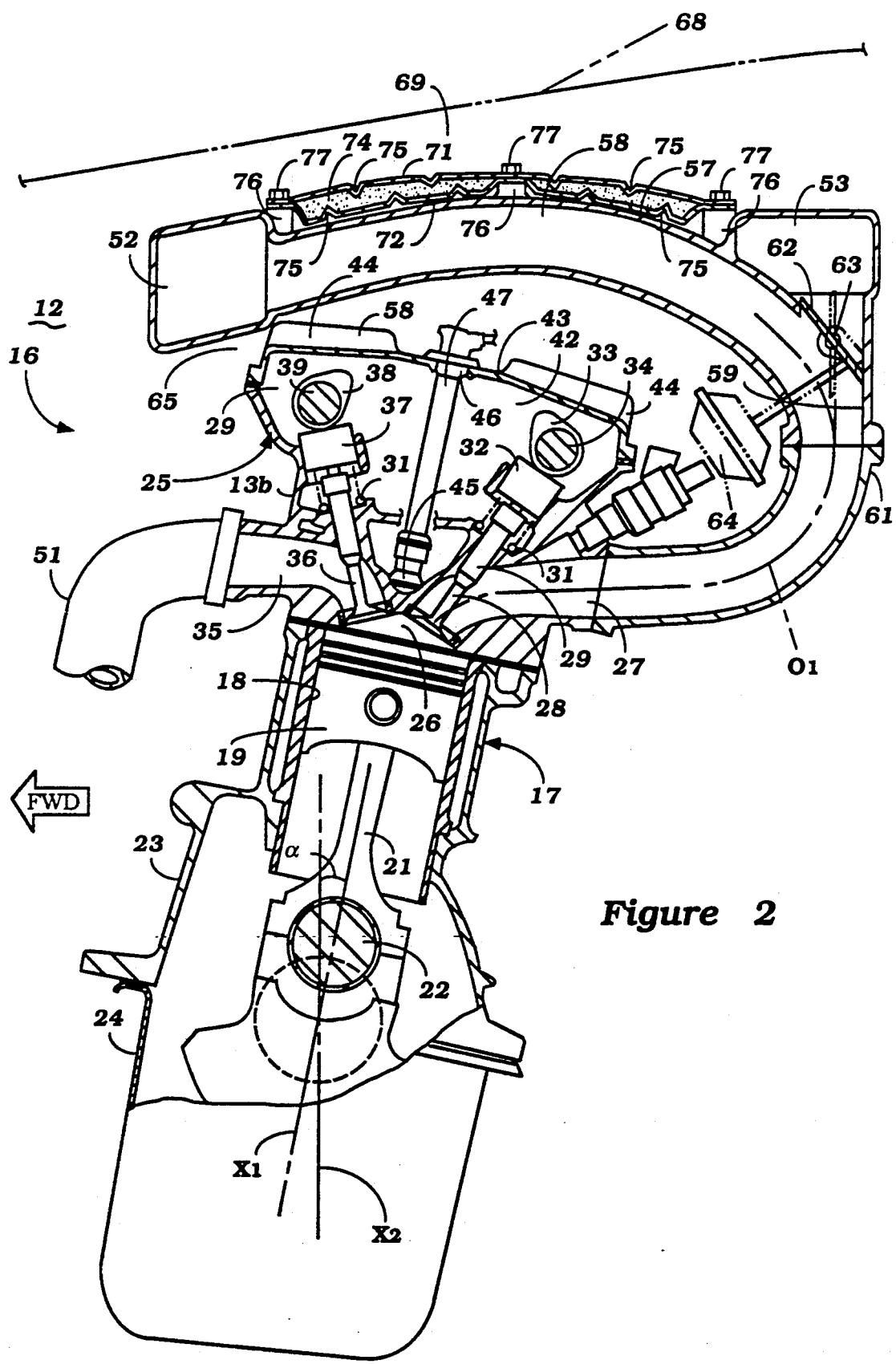
FIG. 2 is an enlarged cross sectional view taken through the engine compartment and passing through one cylinder of the engine.
Figure 3:
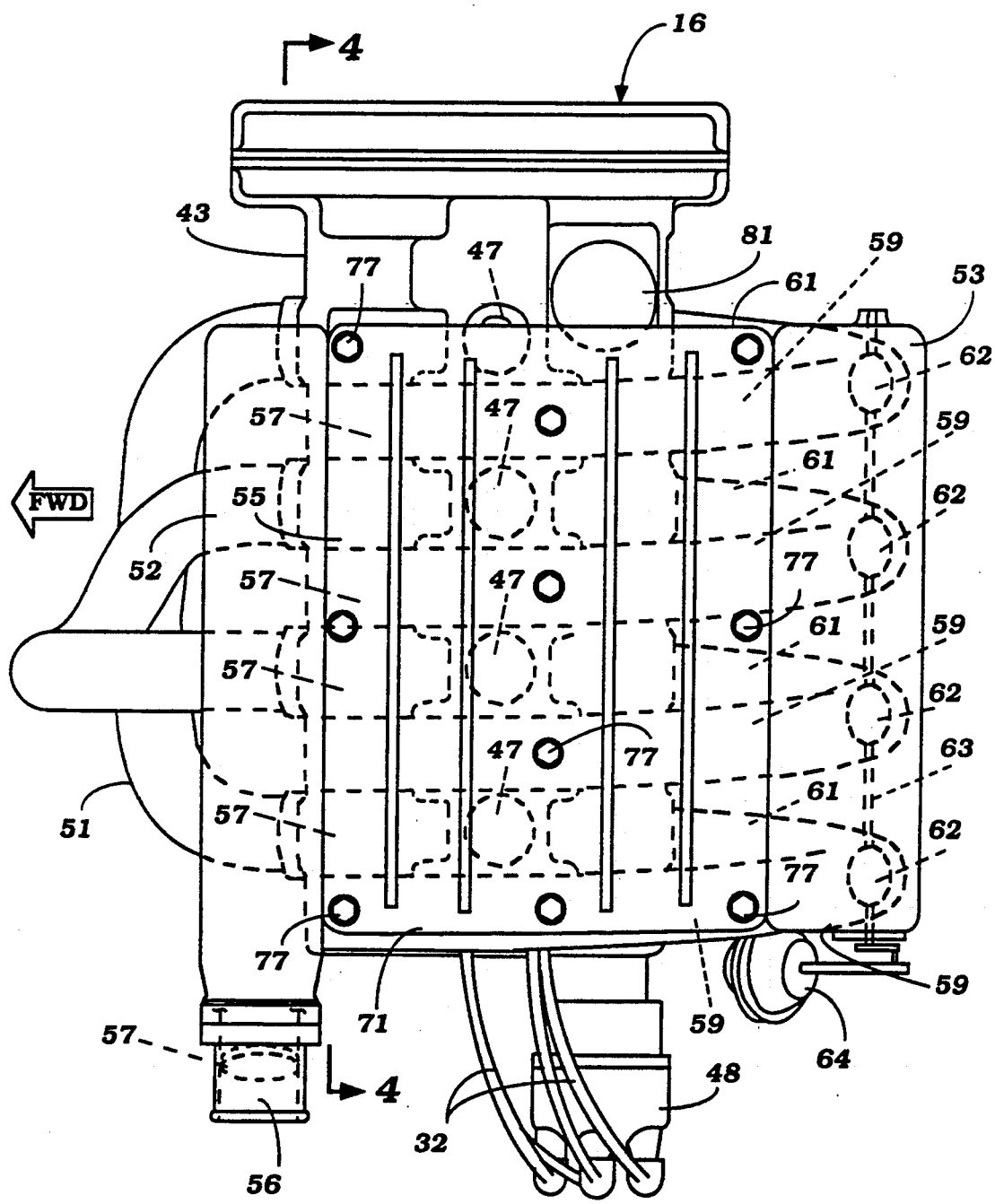
FIG. 3 is a top plan view of the engine.
Figure 4:
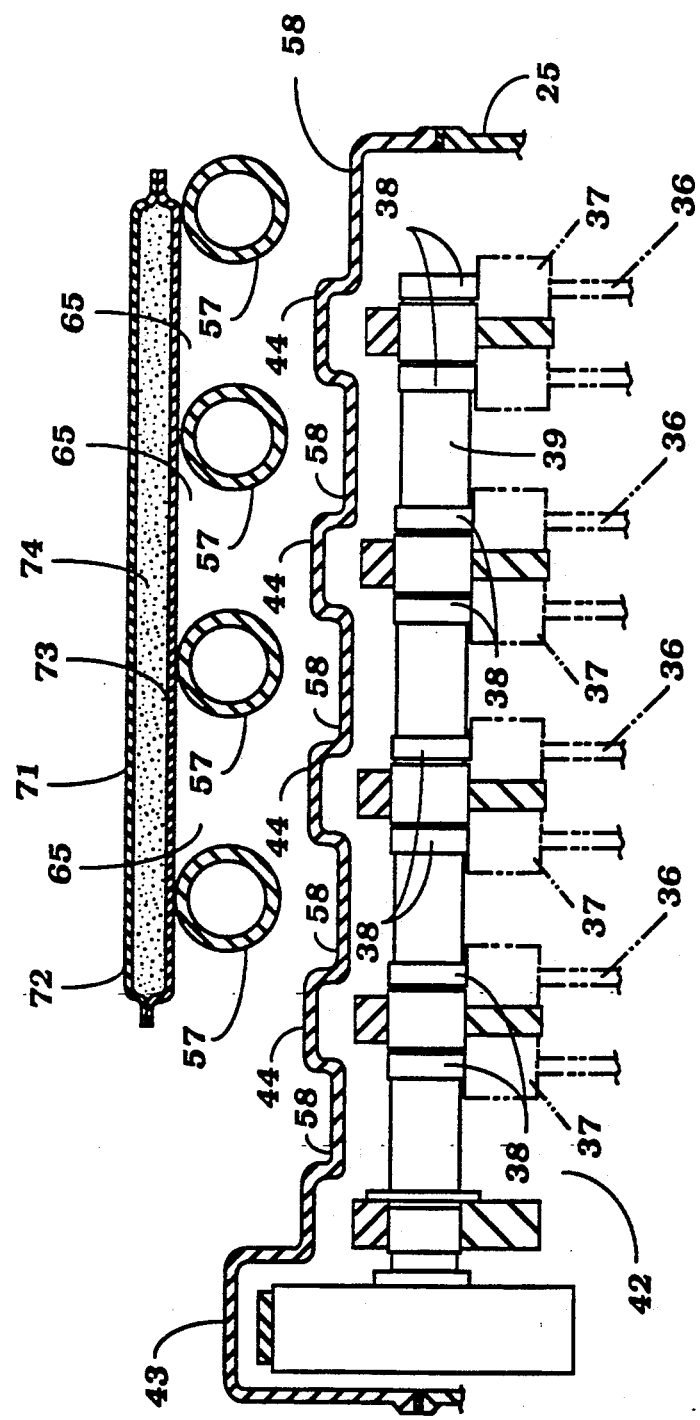
FIG. 4 is a cross sectional view taken along the line 4—4 of FIG. 3.

Referring now additionally to FIGS. 2 through 4, the engine 16, as has been previously noted, is of the four cylinder in line type. To this end, a cylinder block 17 is provided with four aligned cylinder bores 18 in which pistons 19 reciprocate. The pistons 19 are connected by means of connecting rods 21 to individual throws of a crankshaft 22 for driving the crankshaft as is well known. The crankshaft 22 is journaled for rotation within a crankcase chamber defined by a skirt 23 of the cylinder block 17 to which a crankcase or oil pan 24 is affixed in a known manner.

A cylinder head assembly 25 is affixed to the cylinder block 17 in a known manner and has individual combustion chamber recesses 26 that cooperate with the cylinder bores 18 and pistons 19 to form the combustion chambers of the engine. A plurality of intake ports 27, in the illustrated embodiment, one for each combustion chamber 26, extend through the rear face of the cylinder head 25 and terminate at the combustion chambers 26. Poppet type intake valves 28 are slidably supported by guides 29 in the cylinder head 25 and are urged toward their closed positions by means of coil compression springs 31. Thimble tappets 32 are slidably supported in the cylinder head assembly 25 and are operated by the lobes 33 of an intake camshaft 34. The camshaft 34 is journaled for rotation in the cylinder head assembly 25 in a known manner.

Exhaust ports 35 extend through the cylinder head assembly 25 from the combustion chambers 26 to the forward side of the cylinder head assembly 25. As a result, a cross flow cylinder head assembly is provided. Exhaust valves 36 control the opening and closing of the exhaust ports 35 and are urged toward their closed position by coil compression springs. Tappet assemblies 37 are slidably supported in the cylinder head assembly 25 and are operated by the lobes 38 of an exhaust camshaft 39. The exhaust camshaft 39 is journaled for rotation in a known manner.

In the illustrated embodiment, there are provided four valves per cylinder. That is, there are two intake valves 28 for each cylinder and two exhaust valves 36 for each cylinder. However, the intake ports 27 and the exhaust ports 35 are siamese. That is, the intake and exhaust ports 27 and 35 each emanate from a single passageway formed in the respective intake and exhaust side of the cylinder head assembly 25 and then diverge to the individual seats associated with the intake and exhaust valves 28 and 36. Of course, the invention can be utilized in conjunction with engines having different numbers of valves per cylinder.

The valve train as thus far described is contained within a cavity or valve chamber 42 that is formed at the top of the cylinder head assembly 25 and which is closed by a cam cover 43 that is affixed to the cylinder head assembly 25 in a known manner. The cam cover 43 is provided with protrusions 44 adjacent the bearing caps (not shown) which journals the camshafts 34 and 39 and which protrusions overlie the bearing caps 41 so as to provide a clearance area.

Spark plugs 45 are mounted in the cylinder head assembly 25 and are accessible through openings 46 in the cam cover 43. Respective terminals 47 are affixed to the tips of the spark plug and are fired from a distributor 48 (FIGS. 1 and 3) that is located at one end of the engine and which may be driven from the intake camshaft 34 in a suitable manner. Spark leads 49 extend from this distributor 48 to the individual spark plug terminals 47.

An exhaust manifold 51 is affixed to the exhaust or forward side of the cylinder head assembly 25 and conveys the exhaust gases to the atmosphere through an appropriate exhaust system (not shown).

The engine 16 is also supplied with an induction system for delivering a fuel/air charge to the individual intake ports 27 of the cylinder head assembly 25 for delivery to the combustion chambers 26. This induction system includes a first plenum chamber 52 that extends generally along the length of the engine over the exhaust manifold 31 on the exhaust side of the cylinder head assembly 25. There is further provided a second plenum chamber 53 which also extends along the length of the engine 16 but which is positioned on the intake side of the cylinder head assembly 25.

As will be described, the plenum chamber 51 and the runners associated with it are designed so as to primarily improve low and midrange performance. The plenum chamber 53, on the other hand, is designed so as to improve high speed performance.

Air is delivered from the atmosphere to each of the plenum chambers from an air cleaner silencer assembly 54 (FIG. 1) that is positioned in the engine compartment 12 immediately ahead of a battery 60. A short connecting pipe 55 connects the intake device 54 with a throttle body 56 in which a manually operated throttle valve 57 is positioned for controlling the speed of the engine. Air from the plenum chamber 52 is delivered to the plenum chamber 53 through the induction system which will now be described.

A plurality of generally horizontally extending runner pipes 57, one for each cylinder, extend transversely across the cylinder head assembly 25 from the plenum chamber 52 toward the plenum chamber 53. These runners 57 define individual passageways 58 that will supply air from the induction system as thus far described and specifically from the plenum chamber 52 to the individual cylinders of the engine. These runners extend through recesses 58 formed in the cam cover assembly 43 between the protuberances 44 and specifically at locations that are spaced from the spark plugs 57.

As may be best seen in FIG. 2, the runners 57 have a reentrantly curved portion 59 which merges into a manifold section 61 that is attached to the cylinder head and which communicates with its intake ports 27. As a result of this configuration, there is a relatively long intake path provided from the plenum chamber 52 through the runners 57, their portions 59 and the manifold 61 which can be tuned to provide good induction efficiency at low and medium speeds.

The plenum chamber 53 also communicates with the reentrant sections 59 and manifold 61. However, a throttle valve assembly comprised of a plurality of individual throttle valves 62 supported on a throttle valve shaft 63 controls the communication of the plenum chamber 53 with the intake ports 27. A suitable load responsive device such as a vacuum motor 64 (FIGS. 1 and 4) controls the opening and closing of the control valves 62. The operation is such that the valves 62 are maintained in a closed position at low and midrange performance and are opened at high speed. The length of the passages downstream of the valve 62 that communicate the plenum chamber 53 with the combustion chambers 26 is tuned so as to provide good high speed performance. As a result, the described induction system provides good performance under all running conditions and high output can be achieved without sacrificing midrange or low speed performance.

It should be readily apparent that since the induction system or at least a portion of it extends over the cylinder head assembly 25 that there is a danger of heating of the intake system. However, in order to avoid this and provide a good cooling arrangement for the induction system without necessitating a high hood line, the axis of the cylinder bores $X_1$ is canted forwardly or toward to the exhaust side of the engine through an angle $\alpha$ from a vertical plane $X_2$. As a result, this causes the plenum chamber 52 and a major portion of the length of the passages 58 to be positioned at a good height L above the cylinder head and cam cover 43 as clearly shown in FIG. 3. This provides an air gap 65 through which cooling air may flow so as to further cool the induction system. Also, because of the fact that the runners 57 are spaced from each other, this air flow can further be promoted with the air entering through the grille opening 14 of the engine compartment 12.

In addition to the components as thus far described, various accessories may be driven from the camshaft drive of the engine such a generator, alternator, air conditioning compressor or power steering pump, indicated by the reference numeral 66.

It should be noted that the orientation of the engine 16 permits the use of a relatively low hood line as shown in FIG. 2 wherein the hood is identified by the reference numeral 68. However, it should also be noted that the manifold and specifically the runners 57 are positioned very close to the hood 68 with a small air gap 69 therebetween. In order to provide insurance against noise transmission, there is provided a silencing plate assembly, indicated generally by the reference numeral 71 and which is fixed, in a manner to be described, over the manifold runners 57 and above the bulk of the engine and specifically the cylinder head 25 so as to provide silencing.

The plate assembly 71, in the illustrated embodiment, is a laminated assembly consisting of an upper plate 72 and a lower plate 73 that are affixed to each other around their peripheral edges. The plates 71 and 72 define an air gap therebetween which preferably may be filled with a sound deadening material 74 which may also be a heat insulator. In order to provide rigidity, there are a plurality of longitudinally extending grooves 75 formed in the opposite sides of the plate assembly 71.

The plenum chambers 52 and 53 and manifold runners 57 are provided with a plurality of upstanding bosses 76 having tapped openings to which threaded fasteners 77 are affixed so as to affix the plate 71 to the engine. These fasteners 77 are readily removable so that the plate assembly 71 can be readily moved so that the spark plugs of the engine can be replaced and other servicing operations performed. Also, the construction is such that the air flow pattern across the manifold runner 77 is not substantially obstructed so as to insure good silencing. Lubricant may be added to the engine lubricating system through a removable fill cap 81 that is positioned in the valve cover 43.

Figure 5:
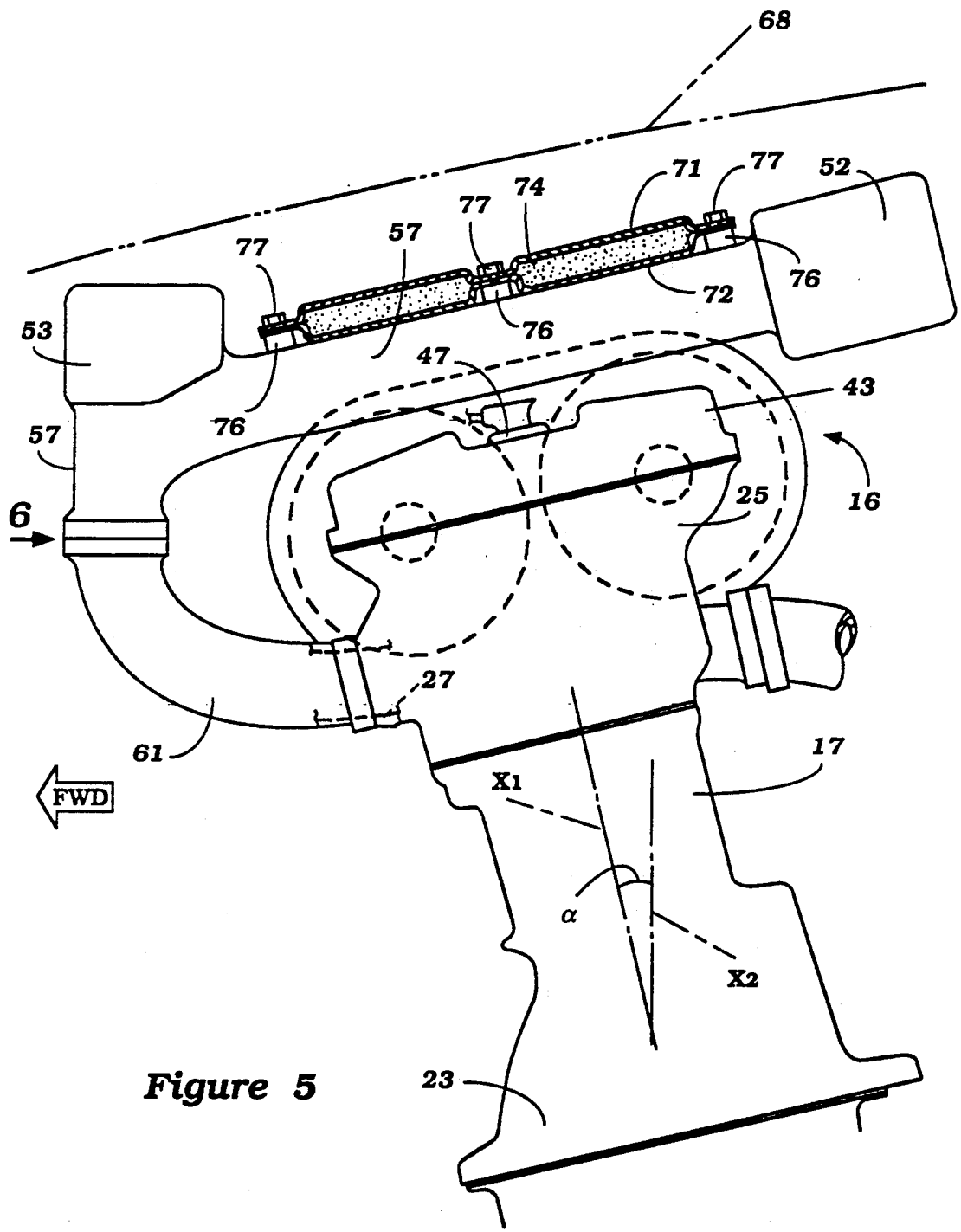
FIG. 5 is a side elevational view, with a portion broken away, generally similar to FIG. 2, but showing another embodiment of the invention.
Figure 6:
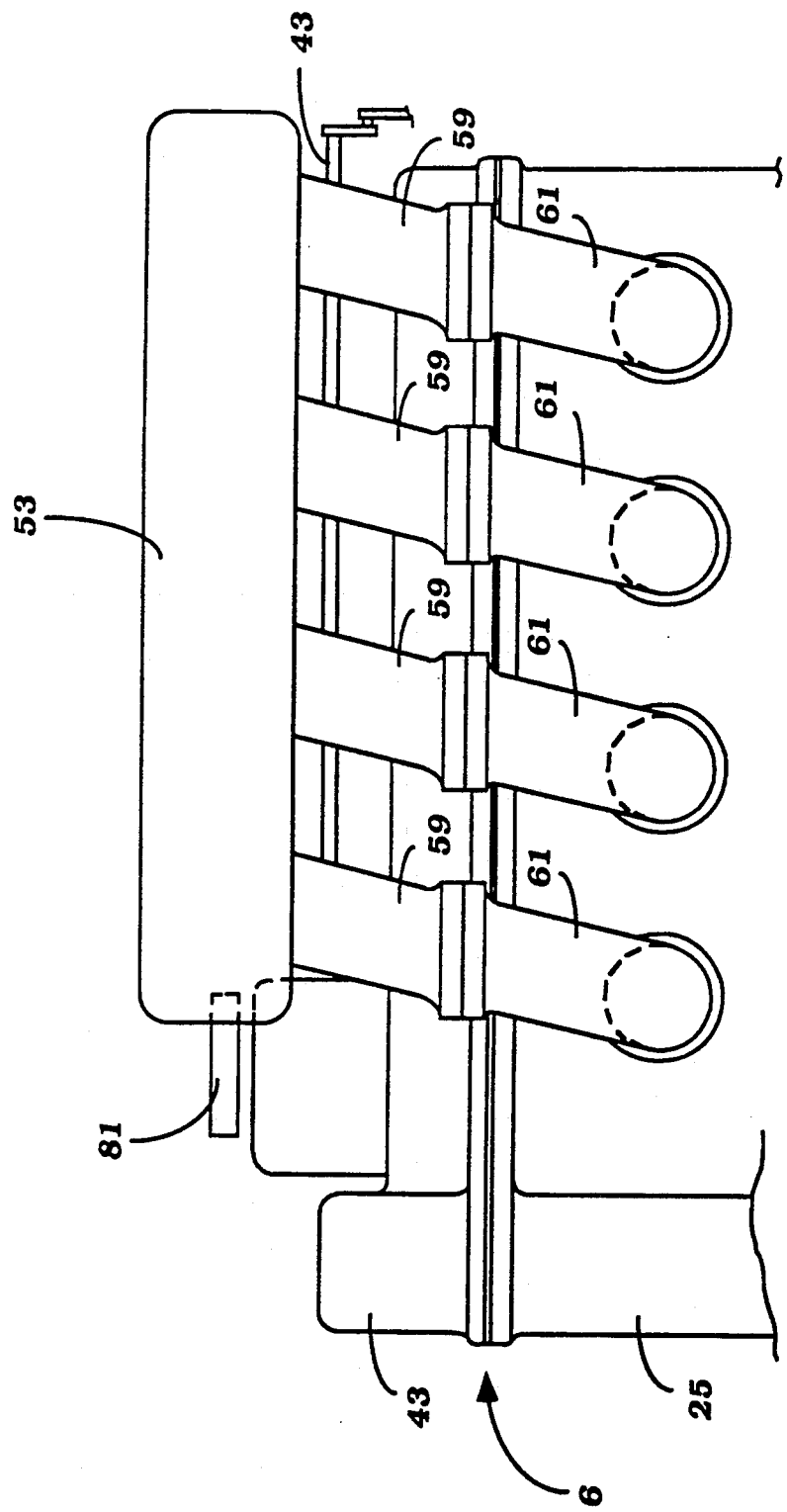
FIG. 6 is a view looking in the direction of the arrow 6 in FIG. 5.

FIGS. 5 and 6 show another embodiment of the invention which is generally similar to the previously described embodiment. In this embodiment, however, the exhaust side of the engine is to the rear and the intake side is to the front. As a result, the engine is canted forwardly rather than rearwardly so as to provide the clearance. Again, it will be seen that the system promotes cooling of the intake manifold and silencing without adverse effects. Since the components of this embodiment are the same as those previously described, the same reference numerals have been employed for identification of components which are the same or substantially the same as those of the preceding embodiment.

Figure 7:
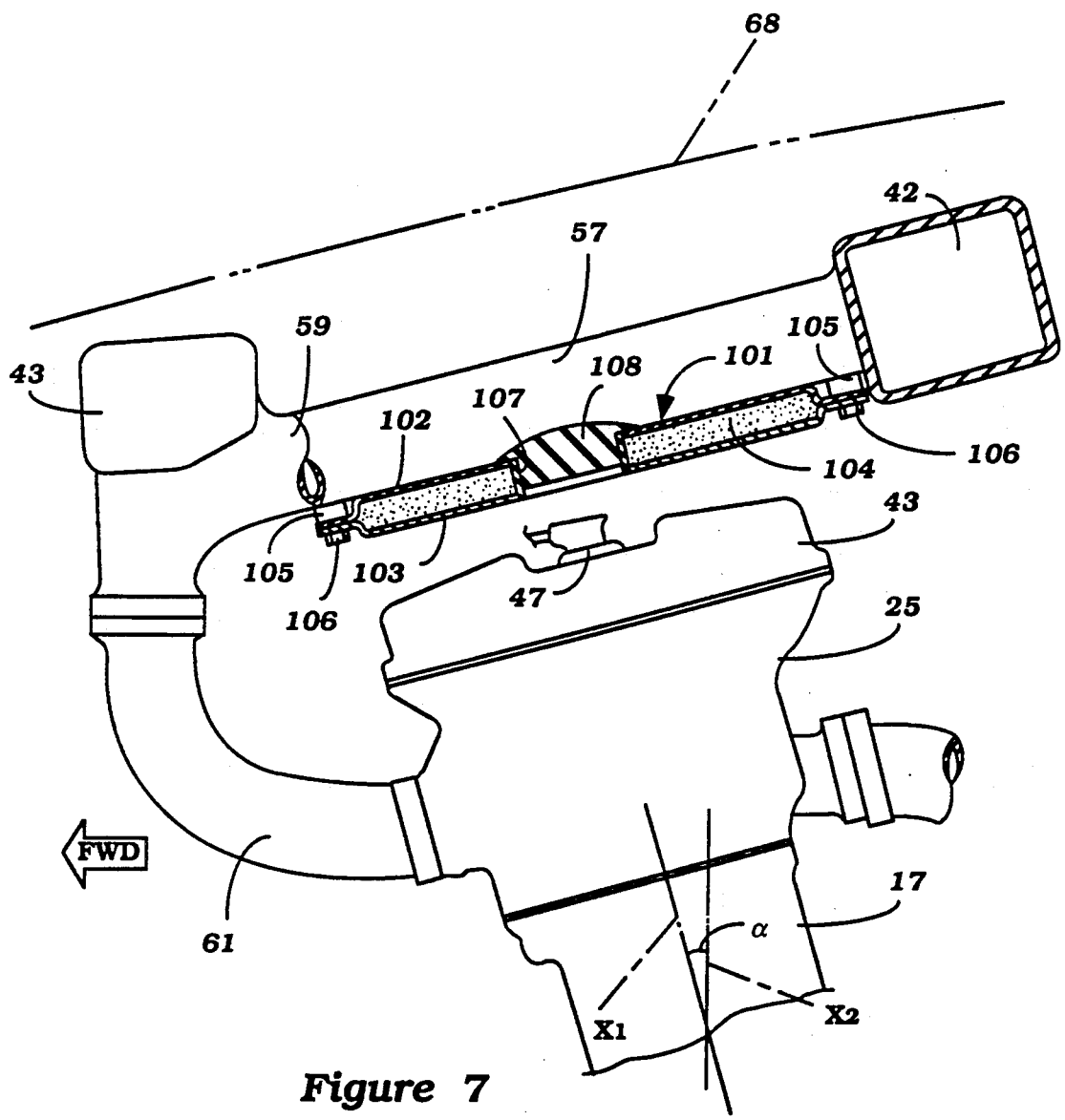
FIG. 7 is a partial side elevational view, with a portion broken away, showing yet another embodiment of the invention
Figure 8:
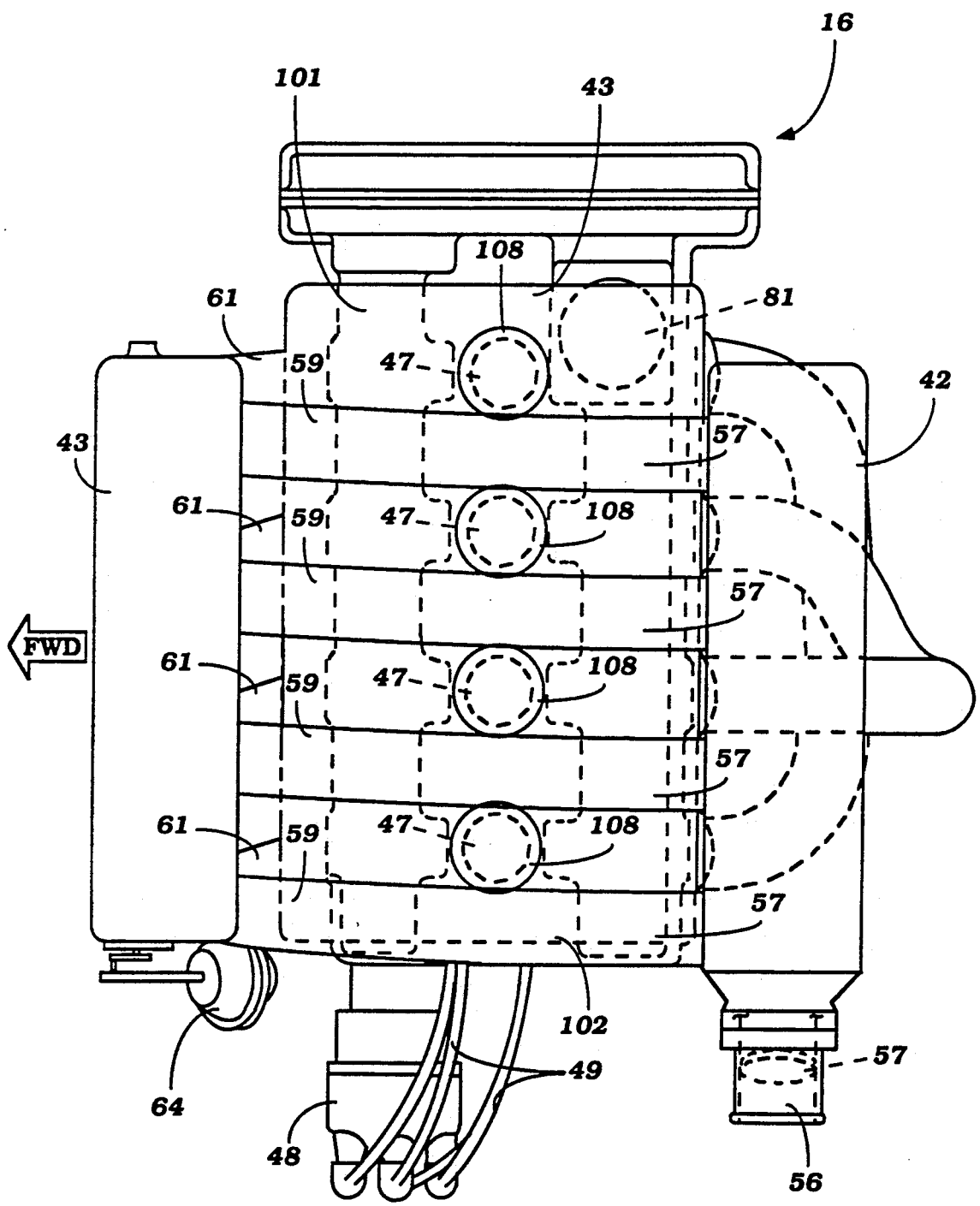
FIG. 8 is a top plan view of this embodiment of the invention.

In the embodiments as thus far described, the sound deadening plate assembly 71 is positioned on top of the manifold runner 71 and thus provides good sound insulation. However, it may be desirable to position the sound deadening plate under the manifold runners. FIGS. 7 and 8 show such an embodiment wherein the engine induction and exhaust systems are disposed as in the embodiment of FIGS. 5 and 6. Due to these similarities, the same reference numerals have been employed to identify common parts.

In this embodiment, a sound deadening plate assembly 101 is affixed, in a manner to be described, to the underside of the manifold runners 57. The plate assembly 101, like the plate assemblies previously described, is a laminated construction consisting of an upper plate 102 and a lower plate 103 that are secured to each other by peripheral flanges around their outer periphery. The void defined by the plates is filled with a sound deadening material 104. In this embodiment, the plate 101 is affixed to the underside of the manifold runners 57 and plenum chambers 42 and 43, by bosses 105 and threaded fasteners 106.

Since the plate assembly 101 is disposed beneath the manifold runners 57, it cannot be conveniently removed for servicing. Therefore, the plate assembly 101 is provided with a plurality of openings 107 that overlie the spark plug terminals 47 and spark plugs 45 and in which removable plugs 108 are retained. The plugs 108 may be easily removed for servicing of the spark plugs as should be readily apparent.

From the foregoing description, it is believed that those skilled in the art should easily understand how the invention is particularly useful in providing a good induction system for the engine that will be adequately cooled and, at the same time, insure against the emanation of noise from the engine to the occupants of the associated motor vehicle. Of course, the foregoing description is that of preferred embodiments of the invention. Various changes and modifications may be made without departing from the spirit and scope of the invention, as defined by the appended claims.

We claim:

1. An internal combustion engine disposed transversely in an engine compartment closed by a hood, a plurality of cylinders lying in a cylinder bank, each having at least one intake port facing in the same direction in said engine compartment, and a plurality of manifold runners, each extending from a respective one of said intake ports and in the opposite direction in said engine compartment to be at least in part over said cylinder bank, and a sound deadening baffle plate separate from but affixed relative to said runners and disposed between the engine and the hood for silencing.

2. An internal combustion engine as set forth in claim 1 wherein the sound deadening baffle plate overlies the manifold runners.

3. An internal combustion engine as set forth in claim 1 wherein the sound deadening baffle plate is disposed beneath the manifold runners.

4. An internal combustion engine as set forth in claim 1 further including an air flow opening disposed in said engine compartment on the end thereof opposite to the direction the intake ports face and wherein the direction of air flow through the engine compartment passes around the runners.

5. An internal combustion engine as set forth in claim 4 wherein the runners are transversely spaced from each other for permitting air flow through the engine compartment to circulate around the runners.

6. An internal combustion engine as set forth in claim 1 wherein the runners extend from a plenum chamber disposed to the side of the engine compartment opposite to the direction the ports face.

7. An internal combustion engine as set forth in claim 6 wherein the plenum chamber extends over an exhaust manifold positioned on the side of said engine opposite the intake ports.

8. An internal combustion engine as set forth in claim 7 further including an air flow opening disposed in said engine compartment on the end thereof opposite to the direction the intake ports face and wherein the direction of air flow through the engine compartment passes around the runners.

9. An internal combustion engine as set forth in claim 8 wherein the runners are transversely spaced from each other for permitting air flow through the engine compartment to circulate around the runners.

10. An internal combustion engine as set forth in claim 6 wherein the plenum chamber lies above the cylinder bank.

11. An internal combustion engine as set forth in claim 10 further including an air flow opening disposed in said engine compartment on the end thereof opposite to the direction the intake ports face and wherein the direction of air flow through the engine compartment passes around the runners.

12. An internal combustion engine as set forth in claim 11 wherein the runners are transversely spaced from each other for permitting air flow through the engine compartment to circulate around the runners.

13. An internal combustion engine as set forth in claim 6 including a second plenum chamber communicating with the runners and disposed on the intake port side of the engine.

14. An internal combustion engine as set forth in claim 13 further including throttle valve means for controlling the communication of the second plenum chamber with the intake passages.

15. An internal combustion engine as set forth in claim 14 wherein the plenum chamber extends over an exhaust manifold positioned on the other side of said engine.

16. An internal combustion engine as set forth in claim 15 further including an air flow opening disposed in said engine compartment on the other end thereof opposite to the direction the intake ports face and wherein the direction of air flow through the engine compartment passes around the runners.

17. An internal combustion engine as set forth in claim 16 wherein the runners are transversely spaced from each other for permitting air flow through the engine compartment to circulate around the runners.

18. An internal combustion engine as set forth in claim 14 wherein the first mentioned plenum chamber lies above the cylinder bank.

19. An internal combustion engine as set forth in claim 1 wherein the baffle plate is detachably affixed to the runners for removal for servicing.

20. An internal combustion engine as set forth in claim 1 wherein the baffle plate is affixed to the underside of the runners and has openings closed by removable plugs in alignment with the engine spark plugs for servicing the engine spark plugs without removing the baffle plate.

* * * * *